(12) United States Patent
Li et al.

(10) Patent No.: US 10,439,538 B2
(45) Date of Patent: Oct. 8, 2019

(54) METHOD AND SYSTEM FOR ESTIMATING A ROTOR POSITION WITH A NOTCH FILTER

(71) Applicant: Deere & Company, Moline, IL (US)

(72) Inventors: Dan Li, Fargo, ND (US); Jacob Pence, Dubuque, IA (US); Long Wu, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 444 days.

(21) Appl. No.: 15/142,645

(22) Filed: Apr. 29, 2016

(65) Prior Publication Data

US 2017/0317633 A1    Nov. 2, 2017

(51) Int. Cl.
| | |
|---|---|
| *H02P 6/16* | (2016.01) |
| *G01D 5/244* | (2006.01) |
| *H02P 21/18* | (2016.01) |
| *H02P 23/18* | (2016.01) |
| *H02K 11/225* | (2016.01) |

(52) U.S. Cl.
CPC ............ *H02P 23/18* (2016.02); *H02K 11/225* (2016.01); *H02P 2203/00* (2013.01)

(58) Field of Classification Search
CPC ................ H02L 2924/00; H02P 27/08; H02M 2001/0009; H02M 1/36; H02J 4/00
See application file for complete search history.

(56) References Cited

U.S. PATENT DOCUMENTS

| 5,642,461 | A * | 6/1997 | Lewis ....................... H02P 6/06 318/600 |
|---|---|---|---|
| 6,005,364 | A | 12/1999 | Acarnley |
| 7,180,262 | B2 | 2/2007 | Consoli et al. |
| 7,755,317 | B2 | 7/2010 | Yu et al. |
| 2003/0024759 | A1* | 2/2003 | Williams ............. B62D 5/0463 180/443 |
| 2004/0104710 | A1* | 6/2004 | Akizuki .................... H02P 6/16 322/51 |
| 2007/0153878 | A1* | 7/2007 | Filipovic .............. H04B 1/1036 375/147 |

(Continued)

FOREIGN PATENT DOCUMENTS

JP        2003189656 A       7/2003

OTHER PUBLICATIONS

Massachusetts Institute of TechnologyDepartment of Mechanical Engineering "2.161 Signal Processing—Continuous and Discrete", 2008.*

(Continued)

*Primary Examiner* — Shawki S Ismail
*Assistant Examiner* — Zoheb S Imtiaz (57) ABSTRACT

A motor has a rotor that rotates in response to one or more alternating current input signals. A position sensor is adapted to generate a substantially saw-tooth waveform indicative of a position of the rotor. A primary processing module or data processor is capable of providing position data and speed data for the rotor based on the substantially saw-tooth waveform. A notch filter can reject one or more selected frequency components in the substantially saw-tooth waveform to reduce distortion off the substantially saw-tooth waveform that would otherwise tend to cause inaccuracy in the provided position data and speed data.

19 Claims, 8 Drawing Sheets

(56) References Cited

U.S. PATENT DOCUMENTS

| | | | |
|---|---|---|---|
| 2010/0301790 A1 | 12/2010 | Liu et al. | |
| 2011/0221378 A1* | 9/2011 | Tazawa | H02P 29/50 |
| | | | 318/619 |
| 2012/0217909 A1* | 8/2012 | Wu | H02P 21/04 |
| | | | 318/400.02 |
| 2015/0176964 A1* | 6/2015 | Uberti | G01R 33/0029 |
| | | | 702/95 |
| 2015/0202963 A1* | 7/2015 | Li | B60L 3/0061 |
| | | | 701/33.1 |

OTHER PUBLICATIONS

European Search Report issued in counterpart application No. 17165061.7 dated Oct. 11, 2017. (11 pages).
Matched Z-transform method. Wikipedia, Apr. 21, 2015 [online encyclopedia] [retrieved on Sep. 29, 2017]. Retrieved from the Internet: <URL:https://en.wikipedia.org/w/index.php?title=Matched_Z-transform_method&oldid=657649931>.
Zhao, Q.; Liang, F; and Li, W. "A New Control Scheme for LCL-type Grid-connected Inverter With a Notch Filter." Institute of Electrical and Electronics Engineers, 2015, the 27th Chinese Control and Decision Conference, pp. 4073-4077 [online], [retrieved on Aug. 3, 2016]. Retrieved from the Internet <URL: http://ieeexplore.ieee.org/document/7162637/?arnumber=7162637&tag=1>.

* cited by examiner

Frequency Distortion (Warping) Due to Bilinear Transformation

METHOD AND SYSTEM FOR ESTIMATING A ROTOR POSITION WITH A NOTCH FILTER

GOVERNMENT LICENSE RIGHTS

This invention was made with government support under Power America Subaward #14-0654-05, awarded by the Department of Energy. The government has certain rights in the invention.

FIELD OF THE INVENTION

This invention relates to a method and system for estimating a rotor position, of an electric motor, with one or more notch filters.

BACKGROUND OF THE INVENTION

An electric motor may feature a rotor with permanent magnets and a stator, such as an interior permanent magnet (IPM) motor or IPM synchronous motor. A position sensor, such as a resolver or encoder, may be used to estimate the angular position of the rotor, the rotational speed of the rotor, or both. In certain prior art, the position sensor outputs a position signal, like a saw-tooth position signal, which may contain unwanted frequency components (e.g. harmonics, artifacts or noise) that detract from accurately estimating the position of the rotor and further data processing. Accordingly, there is need for improving an accuracy of an estimated position of the rotor of an electric motor.

SUMMARY OF THE INVENTION

In accordance with one embodiment, a method and system is presented for estimating a rotor position with a notch filter. A motor has a rotor that rotates in response to one or more alternating current input signals. A position sensor is adapted to generate a substantially saw-tooth waveform or other waveform indicative of a position of the rotor. A primary processing module or data processor is capable of providing position data and speed data for the rotor based on the substantially saw-tooth waveform or the other waveform. A notch filter or set of notch filters can reject one or more selected frequency components in the substantially saw-tooth waveform or the other waveform to reduce distortion of the substantially saw-tooth waveform that would otherwise tend to cause inaccuracy in the provided position data and speed data.

DESCRIPTION OF THE PREFERRED EMBODIMENT

Figure 1:
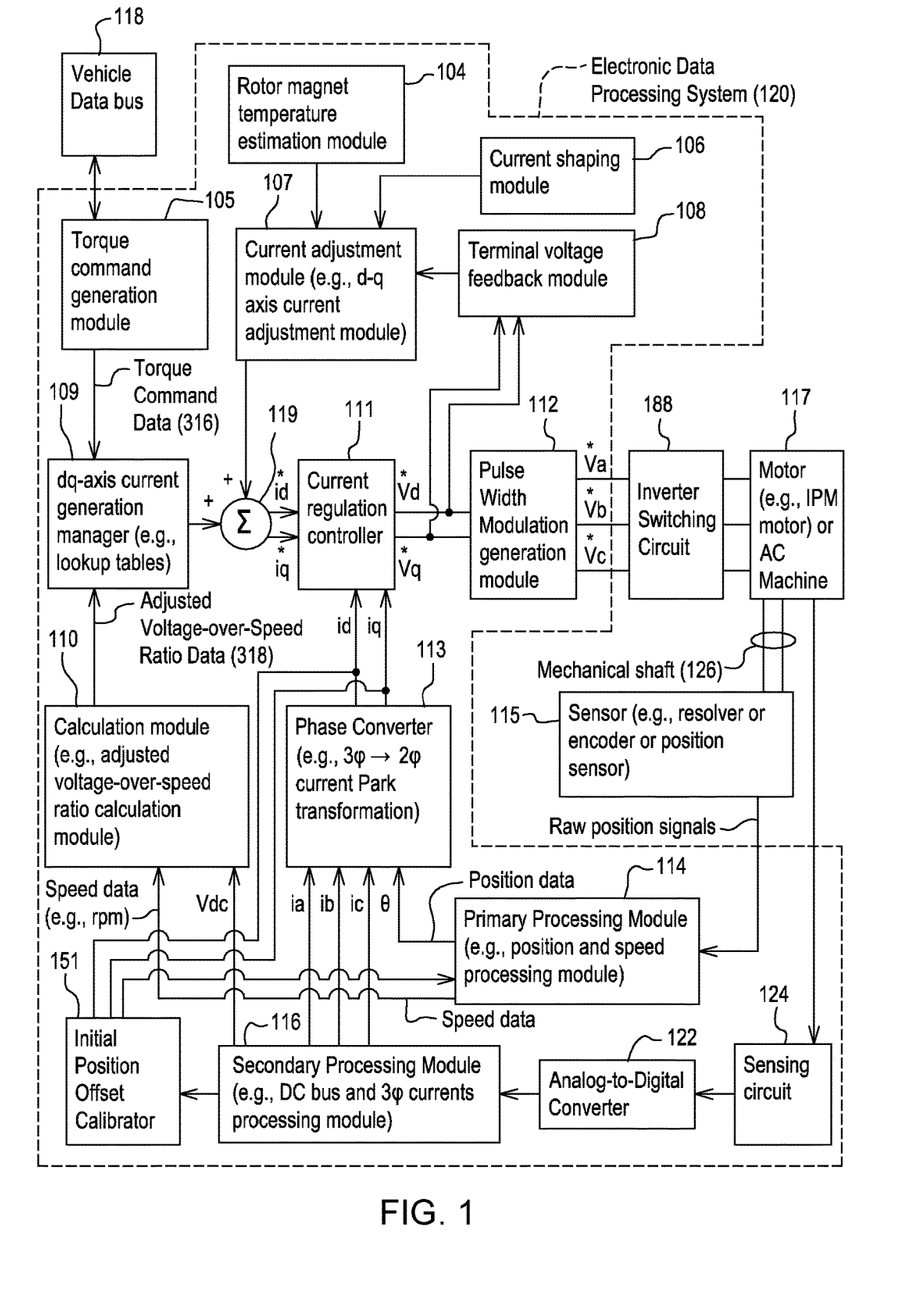
FIG. 1 is a block diagram of one embodiment of a system for estimating a rotor position with a notch filter.

In accordance with one embodiment, FIG. 1 discloses system for controlling a motor 117 (e.g., an interior permanent magnet (IPM) motor) or another alternating current machine. In one embodiment, the system, aside from the motor 117, may be referred to as an inverter or a motor controller.

The system comprises electronic modules, software modules, or both. In one embodiment, the motor controller comprises an electronic data processing system 120 to support storing, processing or execution of software instructions of one or more software modules. The electronic data processing system 120 is indicated by the dashed lines in FIG. 1 and one possible configuration of the electronic data processing system 120 is shown in greater detail in FIG. 2.

The electronic data processing system 120 is coupled to an inverter switching circuit 188. The inverter switching circuit 188 comprises a semiconductor drive circuit that drives or controls switching semiconductors (e.g., insulated gate bipolar transistors (IGBT) or other power transistors) to output control signals for the motor 117. In turn, the inverter switching circuit 188 is coupled to the motor 117. The motor 117 is associated with a sensor 115 (e.g., a position sensor, a resolver or encoder position sensor) that is associated with the motor shaft 126 or the rotor. The sensor 115 and the motor 117 are coupled to the electronic data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter switching circuit 188, three phase voltage data, or other thermal or performance information for the motor 117.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the motor 117. The output of the d-q axis current generation manager 109 and the output of a current adjustment module 107 (e.g., d-q axis current adjustment module 107) are fed to a summer 119. In turn, one or more outputs (e.g., direct axis current command data ($i_d^*$) and quadrature axis current command data ($i_q^*$)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d^*$ and $i_q^*$) and actual d-q axis currents (e.g., $i_d$ and $i_q$) and outputs corresponding d-q axis voltage commands (e.g., $v_d^*$ and $v_q^*$ commands) for input to the PWM generation module 112.

In one embodiment, the PWM generation module 112 converts the direct axis voltage and quadrature axis voltage data from two phase data representations into three phase representations (e.g., three phase voltage representations, such as $v_a^*$, $v_b^*$ and $v_c^*$) for control of the motor 117, for example. Outputs of the PWM generation module 112 are coupled to the inverter switching circuit 188.

The inverter switching circuit 188 comprises power electronics, such as switching semiconductors to generate, modify and control a modulated signal, a pulse-width modulated signal, a pulse-modulated voltage waveform, a voltage signal, or other alternating current signals (e.g., pulse, square wave, sinusoidal, or other waveforms) applied to the motor 117. The PWM generation module 112 provides inputs to a driver stage within the inverter switching circuit 188. An output stage of the inverter switching circuit 188 provides a pulse-width modulated signal or other alternating current signal for control of the motor. In one embodiment, the inverter switching circuit 188 is powered by a direct current (DC) voltage bus.

The motor 117 is associated with a sensor 115 (e.g., a resolver, encoder, speed sensor, or another position sensor or sensors) that estimates at least one of an angular position (e.g., versus time) of the motor shaft 126, a speed or velocity of the motor shaft 126, and a direction of rotation of the motor shaft 126. The sensor 115 may be mounted on or integral with the motor shaft 126. The output of the sensor 115 is capable of communication with the primary processing module 114 (e.g., position and speed processing module). In one embodiment, the sensor 115 may be coupled to an analog-to-digital converter (not shown) that converts analog position data or velocity data to digital position or velocity data, respectively. In other embodiments, the sensor 115 (e.g., digital position encoder) may provide a digital data output of position data or velocity data for the motor shaft 126 or rotor.

A first output (e.g., position data (or angle θ) and speed data for the motor 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module).

An input of a sensing circuit 124 is coupled to terminals of the motor 117 for sensing at least the measured three-phase currents and a voltage level of the direct current (DC) bus (e.g., high voltage DC bus which may provide DC power to the inverter switching circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the motor 117 for measuring three phase currents (e.g., current applied to the windings of the motor 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter switching circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The initial position offset calibrator 151 or the primary position module 114 supports calibration of an initial position offset of the motor shaft 126. In one embodiment, the initial position offset calibrator 151 is capable of communicating with the primary processing module 114, the secondary processing module 116, and receiving measured current input data (e.g., direct-axis and quadrature axis current data) from an output of the phase converter 113, for example.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager 109 or the summer 119.

The rotor magnet temperature estimation module 104 estimates or determines the temperature of the rotor permanent magnet or magnets. In one embodiment, the rotor magnet temperature estimation module 104 may estimate the temperature of the rotor magnets from one or more sensors located on the stator, in thermal communication with the stator, or secured to the housing of the motor 117.

In an alternative embodiment, the rotor magnet temperature estimation module 104 may be replaced with a temperature detector (e.g., a thermistor or infrared thermal sensor coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The sensor 115 on the motor 117 facilitates provision of the detected speed data for the motor shaft 126, where the primary processing module 114 may convert position data provided by the sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104, the current shaping module 106, and the terminal voltage feedback module 108.

The current shaping module 106 may determine a correction or preliminary adjustment of the quadrature axis (q-axis) current command and the direct axis (d-axis) current command based on one or more of the following factors: torque load on the motor 117 and speed of the motor 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to the d-axis and q-axis current based on controller voltage command versus voltage limit. The current adjustment module 107 may provide an aggregate current adjustment that considers one or more of the following adjustments: a preliminary adjustment, a secondary adjustment, and a third adjustment.

In one embodiment, the motor 117 may comprise an interior permanent magnet (IPM) machine or an IPM synchronous machine (IPMSM). An IPMSM has many favorable advantages compared with conventional induction machines or surface mounted PM machines (SMPM) such as high efficiency, high power density, wide constant power operating region, maintenance free, for instance.

The sensor 115 (e.g., shaft or rotor speed detector) may comprise one or more of the following: a position sensor, a direct current motor, an optical encoder, a magnetic field sensor (e.g., Hall Effect sensor), magneto-resistive sensor, and a resolver (e.g., a brushless resolver). In one configuration, the sensor 115 comprises a position sensor, where position data (e.g., angular rotor position) and associated time data are processed to determine speed or velocity data for the motor shaft 126 or rotor of the motor. In another configuration, the sensor 115 comprises a speed sensor, or the combination of a speed sensor and an integrator to determine the position of the motor shaft.

In yet another configuration, the sensor 115 comprises an auxiliary, compact direct current generator that is coupled mechanically to the motor shaft 126 of the motor 117 to determine speed of the motor shaft 126, where the direct current generator produces an output voltage proportional to the rotational speed of the motor shaft 126. In still another configuration, the sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126.

In one configuration, the sensor 115 comprises a resolver with a first winding and a second winding, where the first winding is fed with an alternating current, where the voltage induced in the second winding varies with the frequency of rotation of the rotor. In another configuration, the position sensor 115 provides a substantially saw-tooth waveform or other waveform (e.g., substantially triangular or substantially sinusoidal) where the magnitude of the waveform varies over time and corresponds to a particular angular position of the rotor of the motor 117 or electric machine.

Figure 2:
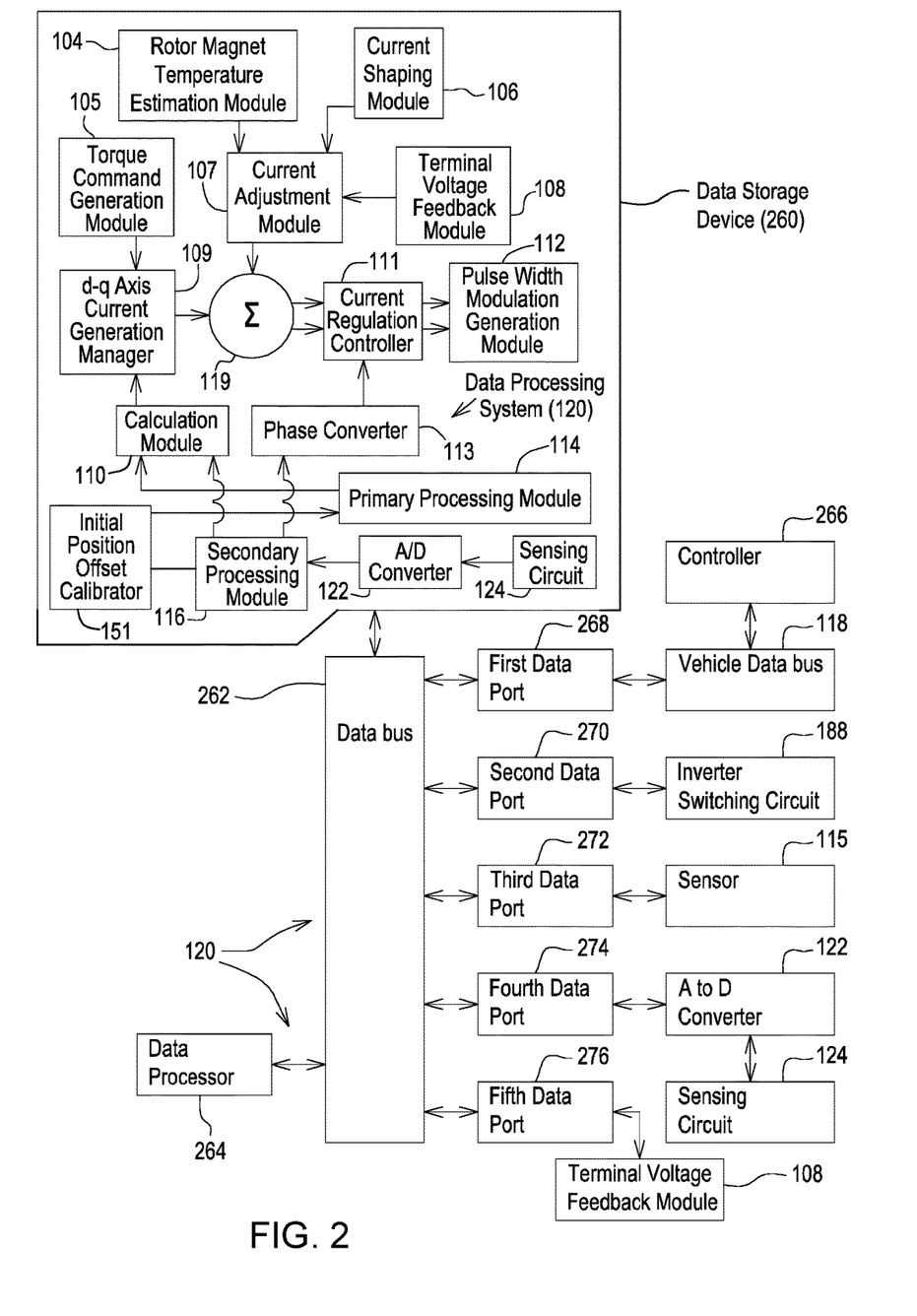
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device or combination of data processing devices.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter switching circuit 188; the third data port 272 may be coupled to the sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the electronic data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

In certain embodiments, the sensor 115 and the primary processing module 114 may be associated with or supported by a third data port 272 of the electronic data processing system 120.

As used throughout this document, "approximately" used in conjunction with an angular position or other number shall mean plus or minus five percent of the angular position or other number. As used through this document, "around" used in conjunction with an angular position or another number shall mean plus or minus ten percent.

Figure 3A:
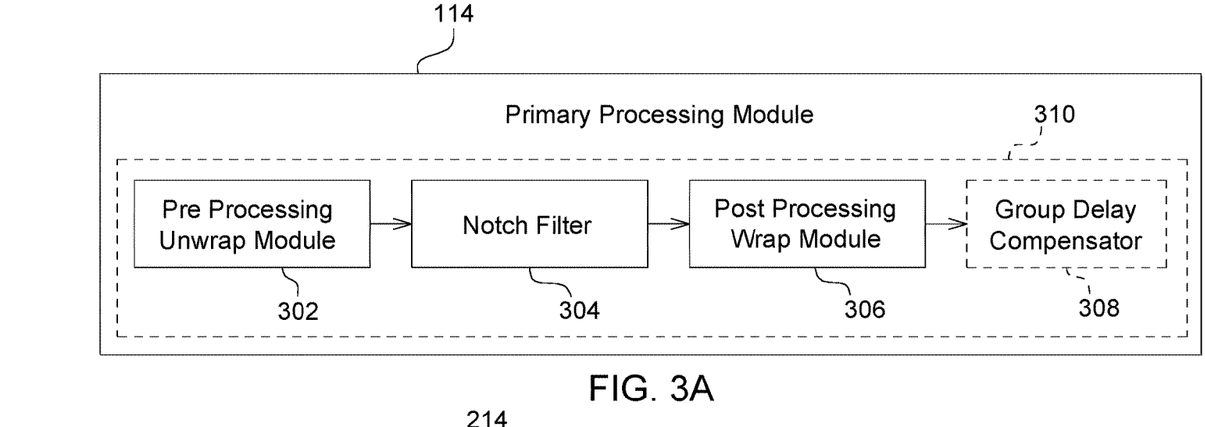
FIG. 3A is a block diagram that shows one embodiment of a notch filter or the primary positioning module of FIG. 1 in greater detail.

FIG. 3A is a block diagram that shows one embodiment of a notch filter 304 or the primary processing module 114 of FIG. 1 in greater detail. In one embodiment, the primary processing module 114 comprises a pre-processing unwrap module 302, a notch filter 304, a post-processing wrap module 306, and a group delay compensator 308. As illustrated, the pre-processing unwrap module 302 is coupled to a notch filter 304. In turn, the notch filter 304 is coupled to a post-processing wrap module 306. The post-processing wrap module 306 feeds an optional group delay compensator 308. The group delay compensator 308 is indicated as optional by the dashed lines and may be deleted in alternate embodiments.

In one embodiment, the primary processing module 114 accepts a raw substantially saw-tooth waveform from the position sensor 115 and determines a refined saw-tooth waveform that it uses to output accurate rotor position data or accurate time-varying rotor position data. For example, the refined saw-tooth waveform may contain less distortion, by or from unwanted frequency components, than the raw substantially saw-tooth waveform. A pre-processing unwrap module 302 processes the raw substantially saw-tooth waveform prior to the notch filter 304. For example, the pre-processing unwrap module 302 decomposes the substantially saw-tooth signal into a sum of harmonically related sinusoidal functions. The notch filter 304 comprises one or more filters to filter, reject or attenuate a set (or range) of undesired frequency components. For example, each notch filter 304 may be tuned to a corresponding rejection frequency. In one configuration, the selection of damping ratio of the notch filter 304 is a tradeoff between the accuracy and settling time of a notch filter, and any suitable damping ration may be used that is less than approximately 0.1.

A post-processing wrap module 306 processes the substantially saw-tooth waveform after or from the notch filter 304. For example, the post-processing wrap module 306 reassembles the filtered harmonically related sinusoidal functions, less the removed frequency components, to a refined substantially saw-tooth waveform or signal.

In one embodiment, the post-processing wrap module 306 feeds a group delay compensator 308 to compensate for the impact of group delay versus frequency response that would otherwise degrade performance of the notch filter 304. Further, the primary processing module 114 can use the filtered, refined saw-tooth waveform to estimate the rotor position, the rotor speed, or both of the electric motor with greater accuracy than otherwise possible with the raw or unfiltered substantially saw-tooth waveform.

Figure 3B:
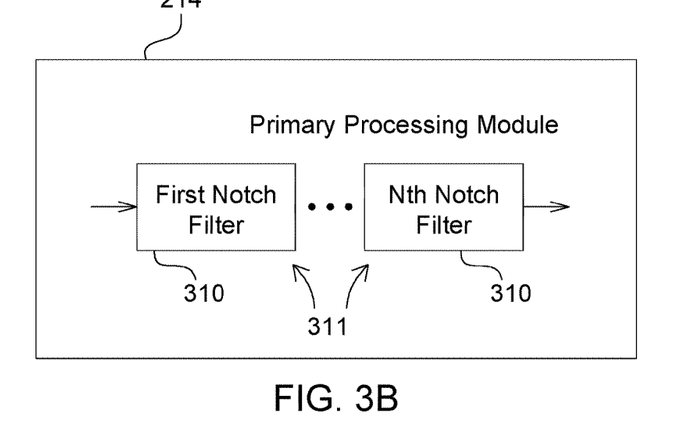
FIG. 3B is a block diagram that shows another embodiment of a notch filter or the primary positioning module of FIG. 1 in greater detail.

FIG. 3B is a block diagram that shows one possible embodiment of a notch filter or the primary positioning module 214 of FIG. 1 in greater detail. The primary processing module 214 of FIG. 3B is similar to the primary processing module 114 of FIG. 3A, except the primary processing module 214 of FIG. 3B comprises a set of notch filters 311, which are arranged in series, or in parallel in alternate embodiments. For example, the primary processing module 214 can replace the primary processing module 114 in FIG. 1. Like reference numbers in FIG. 1, FIG. 3A and FIG. 3B indicate like elements.

In one embodiment, each notch filter 310 within the set of notch filters 311 may be tuned to the same or a different frequency component to reject targeted or undesired frequency components. The notch filter represents a set or series of filters 311 to filter, reject or attenuate a set of undesired frequency components (e.g., harmonic components or electromagnetic noise or interference from the position sensor 115 or resolver). As shown, the set of notch filters 311 comprises a first notch filter 310 through an Nth notch filter 310, where N represents a whole number or a positive integer equal to or greater than two. For example, a first notch filter 310 in the set of notch filters 311 may be tuned to fundamental frequency of the input signals inputted to the motor 117; a second notch filter 310 in the set of notch filters 311 may be tuned to a second harmonic or second multiple of the fundamental frequency; a third notch filter 310 in the set of notch filters 311 may be tuned a frequency that is approximately 2.5 multiplied by the fundamental frequency. One or more notch filters 310 may be adjusted on a regular or periodic basis as the fundamental frequency of the input signals to the electric motor 117 vary over time, such as based on loads, torque commands, motor speed, motor operating mode, motor operating regions with respect to torque and speed, a pulse width modulation mode applied by the inverter switching circuit 188 to the motor 117, or other factors.

In one embodiment, the primary processing module 114 accepts a raw substantially saw-tooth waveform from the position sensor 115 the pre-processing unwrap module 302 and determines a refined saw-tooth waveform that it outputs at the post-processing wrap module 306 or the group delay compensator 308. Further, the primary processing module 114 can use the filtered, refined saw-tooth waveform to estimate the rotor position, the rotor speed, or both of the electric motor with greater accuracy than otherwise possible with the raw or unfiltered substantially saw-tooth waveform.

Figure 4A:
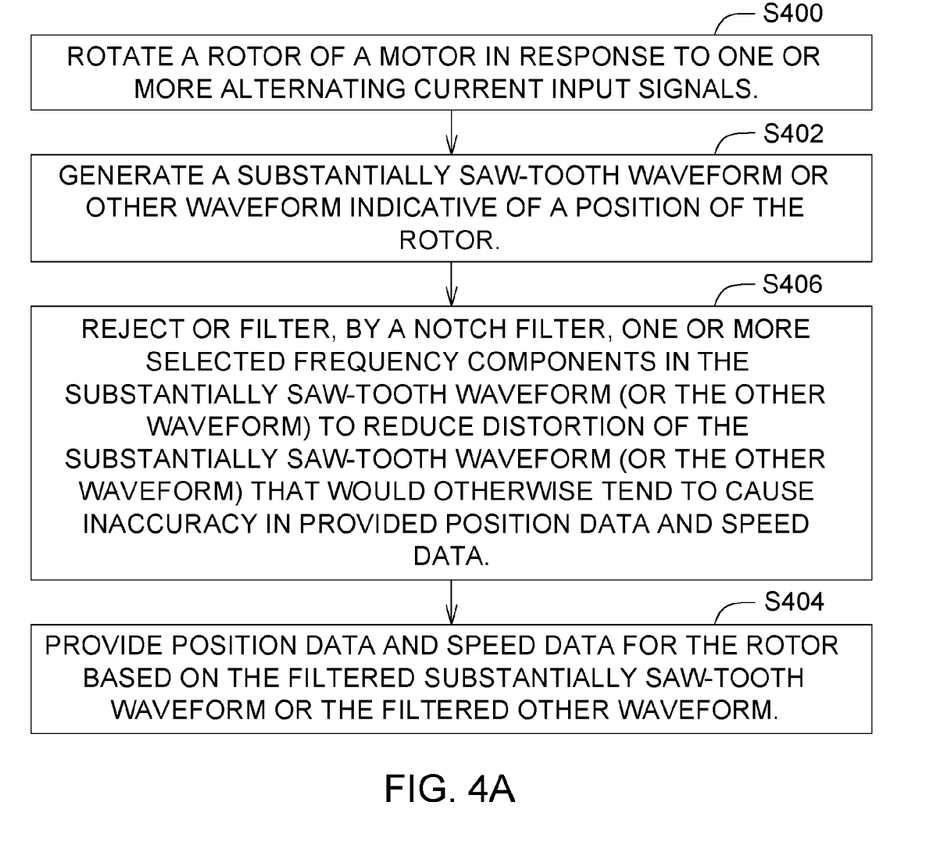
FIG. 4A is a flow chart of a first embodiment of a method for estimating a rotor position, of an electric motor, with a notch filter.

FIG. 4A is a flow chart of a first embodiment of a method for estimating a rotor position of an electric motor with a notch filter 304. The method of FIG. 4A begins in step S400.

In step S400, a motor 117 with a rotor rotates in response to one or more alternating current input signals. For example, an electronic data processing system 120 controls an inverter switching circuit 188 to provide one or more alternating current input signals (e.g., phases) to the motor 117, such as pulse-width modulated signals consistent with the pulse width generation module 112.

In step S402, a position sensor 115 generates a substantially saw-tooth waveform or other waveform indicative of a position of a rotor of the motor 117 versus time. For example, the position sensor 115 generates a substantially saw-tooth waveform, a substantially triangular waveform, a substantially sinusoidal waveform, or any another waveform (e.g., a pulse train of pulses or substantially rectangular waveform) that is capable of indicating the position of the rotor versus time. As used herein, in the context of substantially can mean generally, roughly, approximately or the equivalent of the form or appearance of a waveform, such as a waveform that is not ideal because of electromagnetic noise, measurement error, specifications of the position encoder or resolver, design tolerances, or device tolerances.

In one embodiment, the position sensor 115 comprises a resolver that outputs the substantially saw-tooth waveform or other waveform at a resolver lobe frequency that is an integer multiple of the electrical fundamental frequency of the alternating current input signals. For example, this integer number may equal to one (1) in some cases, which means the number of resolver lobes of the position sensor 115 equals to the number of pole pairs of the motor 117.

In step S406, a notch filter (304 or 311) filters or rejects one or more selected frequency components in the substantially saw-tooth waveform, or the other waveform (e.g., substantially triangular waveform or other suitable waveform) to reduce distortion of the substantially saw-tooth waveform, or the other waveform that would otherwise tend to cause inaccuracy in provided position data and speed data. The notch filter 304 or set of filters 311 attenuate a range of frequencies in accordance with a filter response, which can be expressed in terms of signal magnitude versus frequency. In one embodiment, a notch frequency (e.g. of peak attenuation), a notch frequency range (e.g., within a 3 decibel range or another suitable relative magnitude of peak attenuation) or notch frequencies (e.g., of peak or near peak attenuation) are configurable depending on applications, which may depend upon ambient electromagnetic noise in the operational environment, the specifications of the position encoder, the application of the motor as a traction drive motor for a vehicle, or to drive other vehicle systems; such as compressors, fuel pumps, coolant pumps, oil pumps, power steering pumps, hydraulic pumps; or other factors.

Step S406 may be carried out in accordance with various techniques that may be applied separately or cumulatively. Under a first technique, the selected frequency components of the notch filter 304 comprise an attenuating notch or multiple attenuating notches tuned to one or more of the following frequencies (e.g., of peak signal attenuation): the electrical fundamental frequency, a second harmonic of the fundamental frequency, and the fundamental frequency multiplied by 2.5. Under a second technique, the selected frequency components are adjusted to vary with changes to the fundamental frequency during operation of the motor 117.

Under a third technique, the notch filter (304, 310, 311) has a response in accordance with the following z-domain transfer function:

$$H(z) = \frac{K(z - e^{z_1 T_s})(z - e^{z_2 T_s})}{(z - e^{p_1 T_s})(z - e^{p_2 T_s})}$$

where:

$$K = \frac{1 - (p'_1 + p'_2) + p'_1 p'_2}{1 - (z'_1 + z'_2) + z'_1 z'_2}$$

z represents the z domain that is related to the s-domain by $z = e^{sT_s}$,

Ts is the sampling time in seconds in the z-domain,
z1 a first zero of the notch filter 304 in the s-domain,
z2 is a second zero of the notch filter 304 in the s-domain,
p1 is a first pole of the notch filter 304 in the s-domain,
p2 is a second pole of the notch filter 304 in the s-domain,
z1' a first zero of the notch filter 304 in the z-domain,
z2' is a second zero of the notch filter 304 in the z-domain,
p1' is a first pole of the notch filter 304 in the z-domain, and
p2' is a second pole of the notch filter 304 in the z-domain.

Under a fourth technique, the notch filter 304 has a response derived from a matched pole-zero method to convert accurately an s-domain transfer function into a corresponding z-domain transfer function without distortion or warping of a discrete frequency response versus continuous frequency response for the notch filter 304. In one embodiment, the fourth technique uses the equations set forth for the third technique for a notch filter 304 with two poles and two zeros in accordance with a matched pole-zero method, although in other embodiments a notch filter 304 with any positive integer value or positive whole number of equal poles and zeros can be used, along with corresponding equations.

In step S404, an electronic data processing system 120, a primary processing module 114 or data processor 264 provides position data and speed data for the rotor based on the filtered substantially saw-tooth waveform or the filtered other waveform (e.g., filtered in step S406). Step S404 may be executed prior to, during, or after step S406.

Figure 4B:
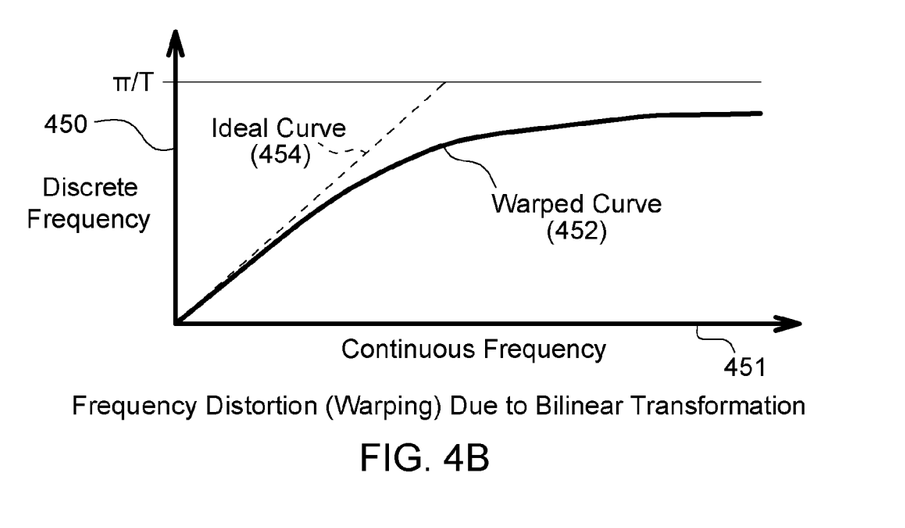
FIG. 4B illustrates possible frequency distortion (or warping) associated with transformation between the s-domain and z-domain, or bilinear transformation.

FIG. 4B illustrates one possible example of distortion or warping that can result from transformation of signals between the s-domain and corresponding z-domain (transform function) that can occur in the absence of the matched pole-zero method, such as the third technique or the second technique for step S406 described in conjunction with FIG. 4A. The s-domain transform can be used to convert a time-varying signal into a Laplace transfer function (to model a notch filter response) that can be solved readily with algebraic equations. The z-domain transform converts a discrete time-varying signal into a complex-number, frequency-domain representation (to model a notch filter response), where the complex number can be expressed with a real number component and an imaginary number component, or where those components are expressed as an exponential power of e.

The vertical axis 450 of FIG. 4B represents a discrete frequency response of the notch filter (304 or 311) and the horizontal axis 451 represents a continuous frequency response of the notch filter (304 or 311) from bilinear transformation. An ideal substantially linear relationship or ideal curve 454 can be achieved with the matched pole-zero method, whereas the warped curve 452 distorts the frequency response in the z-domain from applying transfer functions in accordance with other methods than the matched pole-zero method.

Although it is possible to use pre-warping filtering to compensate for the warping of the conversion process between the s-domain and the z-domain, such pre-warping still tends to distort or delay (e.g., in a skewed, uneven, or frequency selective manner) certain components of the frequencies that are passed through the notch filter (304 or 311).

Figure 5:
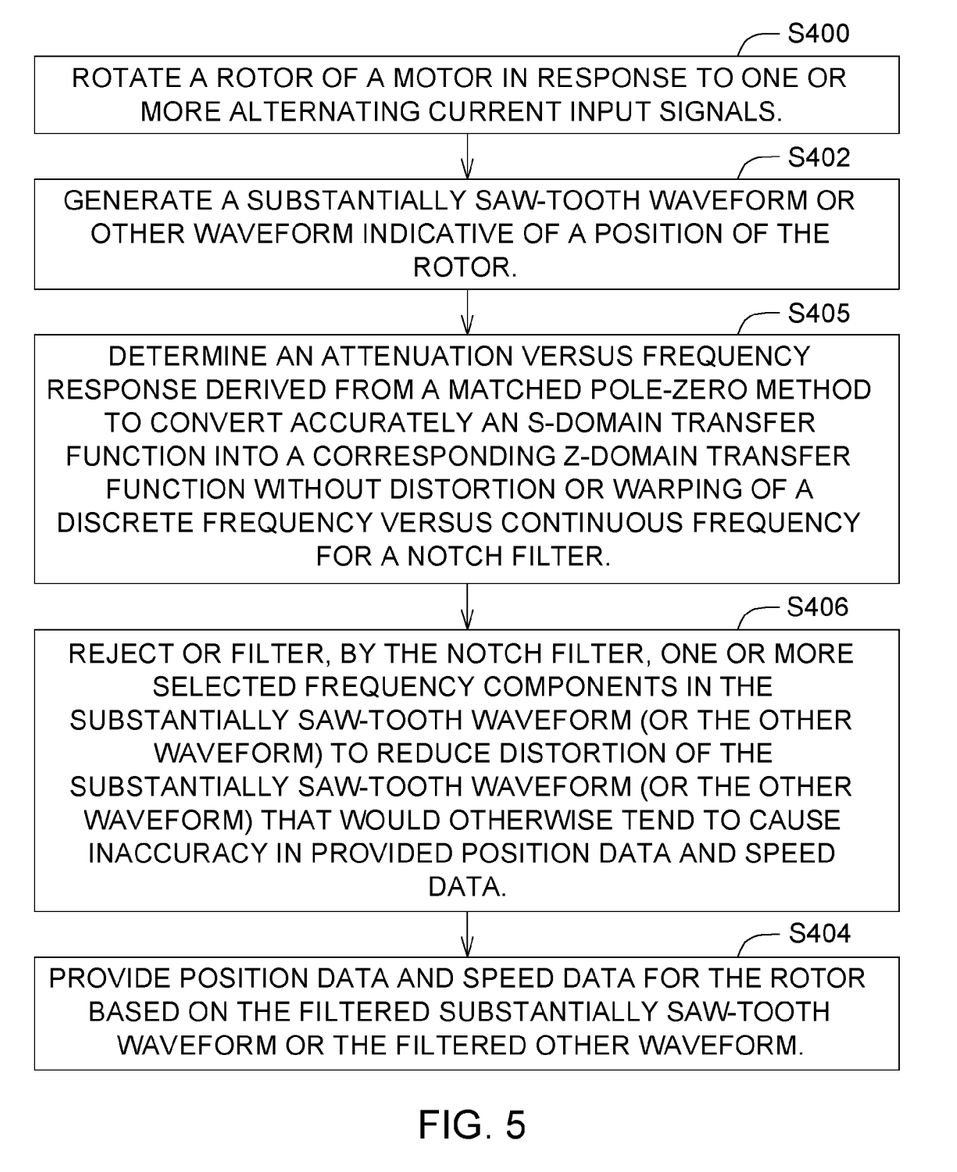
FIG. 5 is a flow chart of a second embodiment of a method for estimating a rotor position, of an electric motor, with a notch filter.

FIG. 5 is a flow chart of a second embodiment of a method for estimating a rotor position, of an electric motor 117, with a notch filter 304. The method of FIG. 5 is similar to the method of FIG. 4A, except the method of FIG. 5 further comprises step S405. Like reference numbers in FIG. 4A and FIG. 5 indicate like steps, features or procedures.

Step S405 can be performed prior to or during step S406, for example.

In step S405, the electronic data processing system 120, primary processing module 114, or data processor 264 determines or implements an attenuation versus frequency response derived from a matched pole-zero method to convert accurately an s-domain transfer function into a corresponding z-domain transfer function without material (e.g., significant) distortion or warping of a discrete frequency versus continuous frequency for the notch filter 304 or multiple notch filters 311 used in series. For example, the conversion from the s-domain transfer function into a corresponding z-domain transfer function may use one or more of the following equations:

$$H(z) = \frac{K(z - z'_1)(z - z'_2)}{(z - p'_1)(z - p'_2)}$$
$$z'_1 = e^{z_1 T_s}$$
$$z'_2 = e^{z_2 T_s}$$
$$p'_1 = e^{p_1 T_s}$$
$$p'_2 = e^{p_2 T_s}$$

$$K = \frac{1 - (p'_1 + p'_2) + p'_1 p'_2}{1 - (z'_1 + z'_2) + z'_1 z'_2}$$

where:
z represents the z domain that is related to the s-domain by $z = e^{sT_s}$,
Ts is the sampling time in seconds in the z-domain,
z1 a first zero of the notch filter 304 in the s-domain,
z2 is a second zero of the notch filter 304 in the s-domain,
p1 is a first pole of the notch filter 304 in the s-domain,
p2 is a second pole of the notch filter 304 in the s-domain,
z1' a first zero of the notch filter 304 in the z-domain,
z2' is a second zero of the notch filter 304 in the z-domain,
p1' is a first pole of the notch filter 304 in the z-domain, and
p2' is a second pole of the notch filter 304 in the z-domain.

Although the above equation applies to a notch filter (304, 310, 311) with two zeros and two poles, the comparable equation or equations may be derived for any positive integer number of matched zeros and poles, for example.

In step S406, the notch filter (304, 310, 311) filters or rejects one or more selected frequency components (e.g., at peak attenuation frequencies) in the substantially saw-tooth waveform, or the other waveform (e.g., substantially triangular waveform or other suitable waveform) to reduce distortion of the substantially saw-tooth waveform, or the other waveform that would otherwise tend to cause inaccuracy in provided position data and speed data. Here, in FIG. 5, the notch filter (304, 310, 311) can filter or reject the frequency components consistent the filter configuration of step S405, where the notch filter (304, 310, 311) has attenuation versus frequency response derived from a matched pole-zero method to convert accurately an s-domain transfer function into a corresponding z-domain transfer function without material (e.g., significant) distortion or warping of a discrete frequency versus continuous frequency. In one embodiment, the notch frequency or notch frequencies (e.g., peak attenuation frequencies or peak attenuation range that corresponds to a half-power or 3 decibel bandwidth from peak signal magnitude) are configurable depending on applications, which may depend upon ambient electromagnetic noise in the operational environment, the specifications of the position encoder, the application of the motor as a traction drive motor for a vehicle, or to drive other vehicle systems; such as compressors, fuel pumps, coolant pumps, oil pumps, power steering pumps, hydraulic pumps; or other factors.

In step S404, an electronic data processing system 120, a primary processing module 114 or data processor 264 provides position data and speed data for the rotor based on the filtered substantially saw-tooth waveform or the filtered other waveform. Step S404 may be executed prior to, during, or after step S406.

Figure 6:
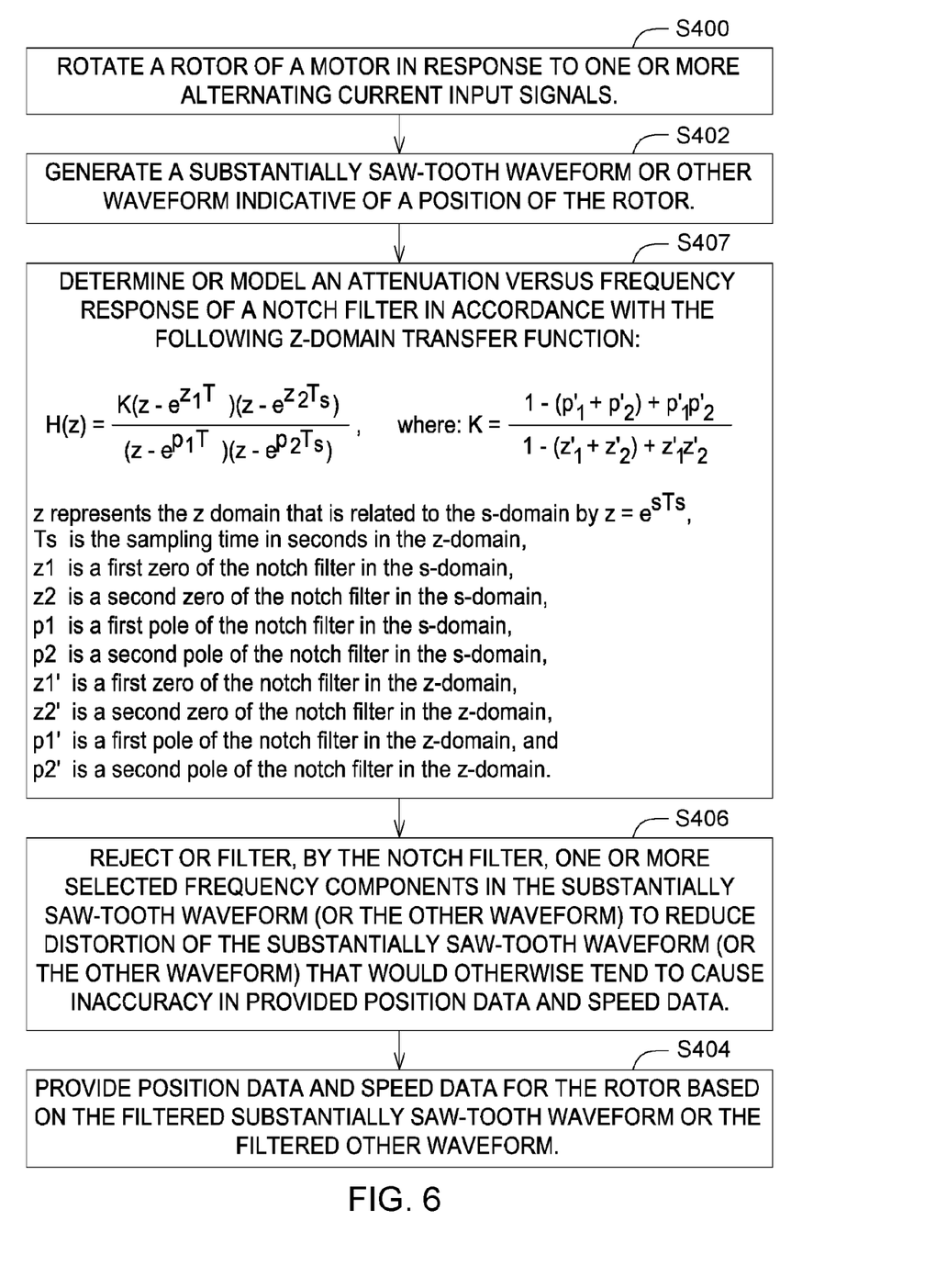
FIG. 6 is a flow chart of a third embodiment of a method for estimating a rotor position, of an electric motor, with a notch filter.

FIG. 6 is a flow chart of a third embodiment of a method for estimating a rotor position, of an electric motor 117, with a notch filter 304. The method of FIG. 6 is similar to the method of FIG. 4A, except the method of FIG. 6 further comprises step S407. Like reference numbers in FIG. 4A and FIG. 6 indicate like steps, features or procedures.

In step S407, the electronic data processing system 120, primary processing module 114, or data processor 264 determines or implements an attenuation versus frequency response of a notch filter (304, 310, 311) in accordance with the following z-domain transfer function:

$$H(z) = \frac{K(z - e^{z_1 T_s})(z - e^{z_2 T_s})}{(z - e^{p_1 T_s})(z - e^{p_2 T_s})}$$

where:

$$K = \frac{1 - (p'_1 + p'_2) + p'_1 p'_2}{1 - (z'_1 + z'_2) + z'_1 z'_2}$$

z represents the z domain that is related to the s-domain by $z = e^{sT_s}$,
Ts is the sampling time in seconds in the z-domain,
z1 a first zero of the notch filter 304 in the s-domain,
z2 is a second zero of the notch filter 304 in the s-domain,
p1 is a first pole of the notch filter 304 in the s-domain,
p2 is a second pole of the notch filter 304 in the s-domain,
z1' a first zero of the notch filter 304 in the z-domain,
z2' is a second zero of the notch filter 304 in the z-domain,
p1' is a first pole of the notch filter 304 in the z-domain, and
p2' is a second pole of the notch filter 304 in the z-domain.

In step S406, the notch filter (304, 310, 311) filters or rejects one or more selected frequency components in the substantially saw-tooth waveform, or the other waveform (e.g., substantially triangular waveform or other suitable waveform) to reduce distortion of the substantially saw-tooth waveform, or the other waveform that would otherwise tend to cause inaccuracy in provided position data and speed data. Here, in FIG. 6, the notch filter (304, 310, 311) can filter or reject the frequency components consistent the filter configuration of step S407, where the notch filter (304, 310, 311) has attenuation versus frequency response derived from a matched pole-zero method to convert accurately an s-domain transfer function into a corresponding z-domain transfer function without material (e.g., significant) distortion or warping of a discrete frequency versus continuous frequency. In one embodiment, the notch frequency or notch frequencies are configurable depending on applications, which may depend upon ambient electromagnetic noise in the operational environment, the specifications of the position encoder, the application of the motor as a traction drive motor for a vehicle, or to drive other vehicle systems; such as compressors, fuel pumps, coolant pumps, oil pumps, power steering pumps, hydraulic pumps; or other factors.

In step S404, an electronic data processing system 120, a primary processing module 114 or data processor provides position data and speed data for the rotor based on the filtered substantially saw-tooth waveform or the filtered other waveform. Step S404 may be executed prior to, during, or after step S406.

Figure 7:
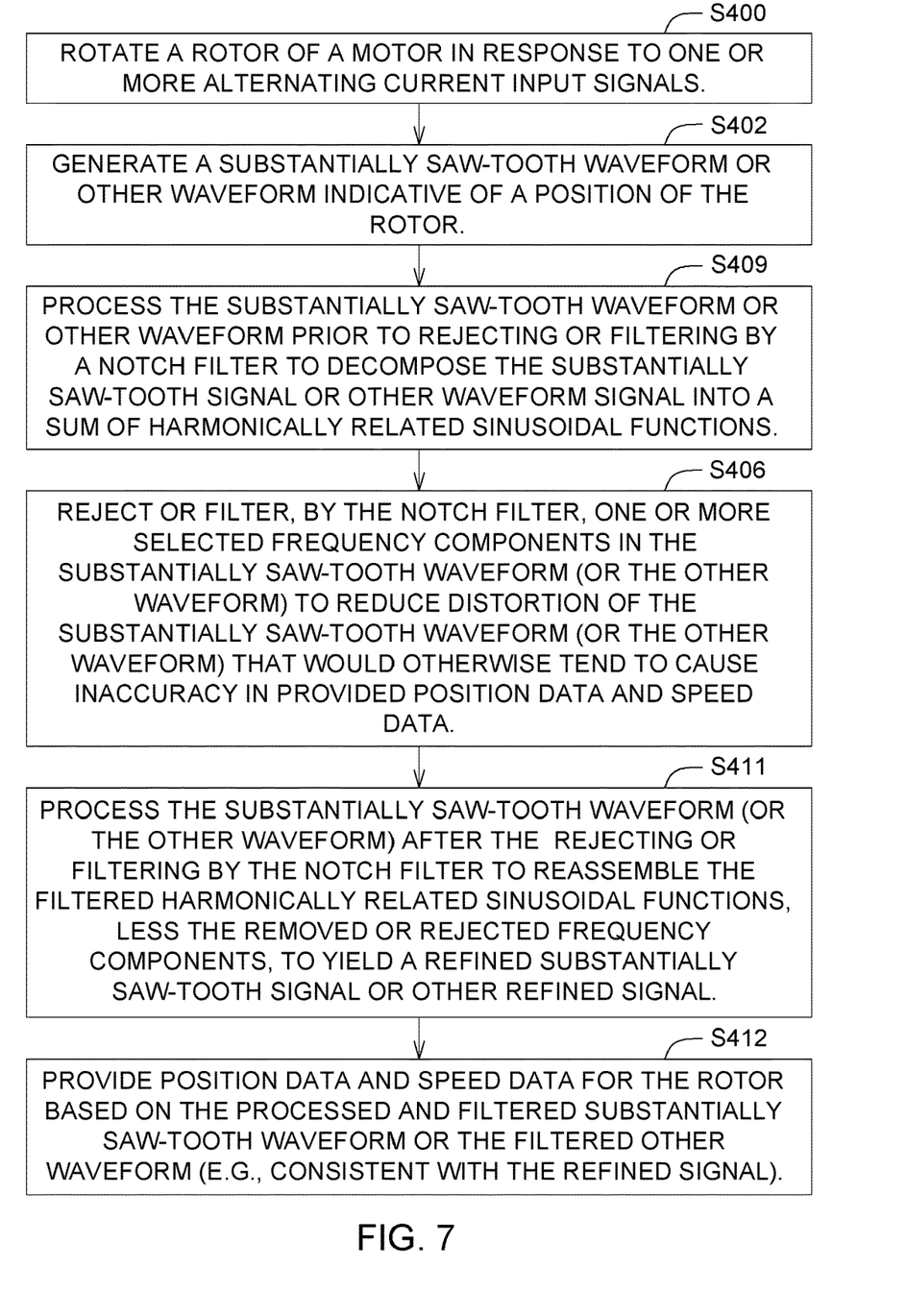
FIG. 7 is a flow chart of a fourth embodiment of a method for estimating a rotor position, of an electric motor, with a notch filter.

FIG. 7 is a flow chart of a fourth embodiment of a method for estimating a rotor position of an electric motor with a notch filter 304. The method of FIG. 7 is similar to the method of FIG. 4A, except the method of FIG. 7 further comprises step S409 and S411 and replaces step S404 with S412. Like reference numbers in FIG. 4A and FIG. 7 indicate like steps, features or procedures.

In step S400, a motor 117 with a rotor rotates in response to one or more alternating current input signals. For example, an electronic data processing system 120 controls an inverter switching circuit 188 to provide one or more alternating current input signals to the motor 117, such as pulse-width modulated signals.

In step S402, a position sensor 115 generates a substantially saw-tooth waveform or other waveform indicative of a position of a rotor of the motor 117 versus time. For example, the position sensor 115 generates a substantially saw-tooth waveform, a substantially triangular waveform, a substantially sinusoidal waveform, or any another waveform (e.g., a pulse train of pulses or substantially rectangular waveform) that is capable of indicating the position of the rotor versus time.

In step S409, an electronic data processing system 120, the primary processing module 114 or the pre-processing unwrap module 302 processes the substantially saw-tooth waveform or other waveform prior to rejecting or filtering by a notch filter 304 to decompose the substantially saw-tooth signal or other waveform signal into a sum of harmonically related sinusoidal functions. Step S409 may be carried out in accordance with various techniques, which may be applied separately or cumulatively.

Under a first technique, the pre-processing unwrap module 302 processes the substantially saw-tooth waveform to remove an extra second harmonic frequency component from an input signal to the notch filter 304 or to remove another undesired frequency component (e.g., by aligning a peak attenuation frequency or range of the notch filter 304 with estimated or actual unwanted frequency or interference signal).

Under a second technique, the electronic data processing system 120, the primary processing module 114 or the pre-processing unwrap module 302 processes the substantially saw-tooth waveform or other waveform in accordance with the following equation:

$$x_T(t) = \sum_{n=1}^{\infty} b_n \sin(n\omega_0 t)$$

where:

$x_T(t)$ is the substantially saw-tooth signal, as a function of time, t, where the saw-tooth signal can be represented in any suitable mathematical format, with a period of T;

n is any of the nth sinusoidal function(s) that is(are) used to model or decompose the substantially saw-tooth signal, where n may range from any positive integer value from 1 to N total sinusoidal functions or where N may approach an infinite number;

$b_n$ is an amplitude of the nth sinusoidal function; and $$\omega_0 = \frac{2\pi}{T}.$$

In step S406, the notch filter 304 filters or rejects one or more selected frequency components in the substantially saw-tooth waveform, or the other waveform (e.g., in decomposed sinusoidal form) to reduce distortion of the substantially saw-tooth waveform, or the other waveform that would otherwise tend to cause inaccuracy in provided position data and speed data. For example, the other waveform may comprise a substantially triangular waveform or other suitable waveform, where the saw-tooth waveform may be preferred to eliminate the requirement for ambiguity resolution (e.g., one-half of the triangular wave can be used or the positive or negative slope of the triangular wave can be detected to eliminate ambiguity) of angular positions with respect to other suitable waveforms. Here, in FIG. 7, the notch filter (304, 311) can filter or reject the frequency components consistent with an output of the pre-processing unwrap module 302 in step S409 to represent the substantially saw-tooth waveform or other waveform as a sum of a set of sinusoidal functions. In one embodiment, the notch frequency or notch frequencies (e.g., peak frequency attenuation) are configurable depending on applications, which may depend upon ambient electromagnetic noise in the operational environment, the specifications of the position encoder, the application of the motor as a traction drive motor for a vehicle, or to drive other vehicle systems; such as compressors, fuel pumps, coolant pumps, oil pumps, power steering pumps, hydraulic pumps; or other factors.

In step S411, an electronic data processing system 120, the primary processing module 114 or the post-processing wrap module 306 processes the substantially saw-tooth waveform or other waveform after rejecting or filtering by the notch filter (304, 311) to reassemble or compose the substantially saw-tooth signal or other waveform signal into a sum of harmonically related sinusoidal functions, less the removed or rejected frequency components. For example, step S411 yields a refined substantially saw-tooth signal or another refined signal that more closely resembles an ideal or undistorted saw-tooth signal.

In one embodiment, the electronic data processing system 120, the primary processing module 114 or the post-processing wrap module 306 processes the substantially saw-tooth waveform or other waveform in accordance with the following equation:

$$x_T(t) = \sum_{n=1}^{\infty} b_n \sin(n\omega_0 t)$$

Before, during or after step S411, the electronic data processing system 120, the primary processing module 114 or compensator 308 may compensate for the group delay to provide a substantially uniform delay. If the notch filter (304, 311) comprises a nonlinear second order filter with a group delay that is function of frequency, the compensator 308 compensates for or adjusts the delay versus frequency response of the notch filter 304 to provide a more uniform delay versus frequency.

In step S412, an electronic data processing system 120, a primary processing module 114 or data processor 264 provides position data and speed data for the rotor based on the processed and filtered substantially saw-tooth waveform, or the processed and filtered other waveform (e.g., consistent with the refined signal or refined substantially saw-tooth signal). Step S412 may be executed prior to, during, or after step S411, alone or in combination with step S406.

Figure 8:
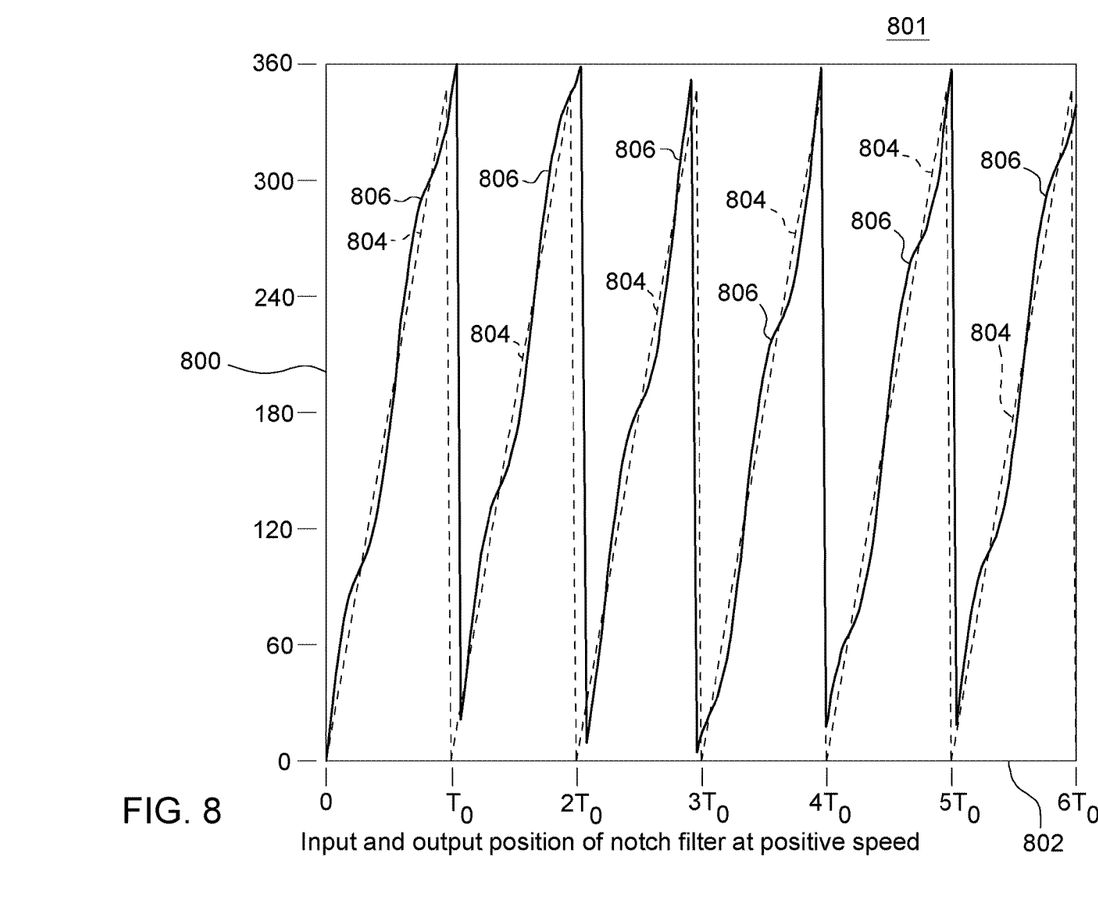
FIG. 8 shows a graph of one possible signal output of a position sensor in comparison to an ideal or model signal output of the position sensor.

FIG. 8 shows a graph 801 of one possible signal output of a position sensor 115 in comparison to an ideal or model signal output of the position sensor 115. In FIG. 8, the vertical axis 800 represents the angular position of the rotor of the motor 117 in degrees. The horizontal axis 802 represents time, where the duration of each period T corresponds to a full angular rotation of the rotor of the motor 117 or electric machine. During each period, T, the angular position of the rotor can vary from zero to approximately three-hundred and sixty degrees versus time.

In FIG. 8, two representations of the sensor signal are provided: (1) a first representation 804 of the sensor signal represents an ideal position versus time relationship, or a first representation 804 in which the waveform represents a refined saw-tooth waveform (e.g., after filtering by one or more notch filters (304, 311) to remove undesired frequency components), and (2) a second representation 806 of the sensor signal in which the (raw) substantially saw-tooth waveform is distorted by undesired frequency components. The difference between the first representation 804 and the second representation at any time along the horizontal axis represents a potential or actual position error in the angular position of the rotor of the motor 117 or electric machine.

As illustrated, the first representation 804 is shown in dashed lines in FIG. 8. The first representation 804 or ideal saw-tooth waveform may comprise a pure saw-tooth waveform that approaches a perfectly formed or shaped saw-tooth waveform, consistent with mathematical representations of the ideal saw-tooth waveform. In one configuration, with respect to the second representation 806 or the distorted substantially saw-tooth waveform, the undesired frequency components may comprise harmonics or extra second harmonics of the fundamental frequency (e.g., $2\omega_0$) of an inverter or motor controller. The notch filter (304 or 311) must reject or filter out the undesired second harmonic frequency component, while the notch filter (304, 311) retains untouched the saw-tooth inherent second harmonic frequency component because the first representation or ideal saw-tooth waveform inherently has proper second harmonics of fundamental frequency. After filtering with one or more notch filters (304, 311), the substantially saw-tooth waveform is transformed from the second representation to more closely resemble the first representation.

The method and system disclosed herein is well-suited for reducing or eliminating unwanted frequency components in the signal outputted by a position sensor, such as resolver to improve accuracy of rotor position estimates versus time. For example, accurate determination of the position of the rotor for motors (e.g., IPM machines) can significantly improve motor control performance to achieve desired output torque and power level and assure robust controllability.

Having described the preferred embodiment, it will become apparent that various modifications can be made without departing from the scope of the invention as defined in the accompanying claims.

The following is claimed:

1. A system for estimating a rotor position of an alternating current motor, the system comprising:
   an alternating current motor with a rotor that rotates in response to one or more alternating current input signals;
   a position sensor that generates a substantially saw-tooth waveform, indicative of a position of the rotor, at a sensor frequency that is an integer multiple of the electrical fundamental frequency of the alternating current input signals;
   a primary processing module for providing position data and speed data for the rotor based on the substantially saw-tooth waveform; and
   a notch filter for rejecting one or more selected frequency components in the substantially saw-tooth waveform to reduce distortion off the substantially saw-tooth waveform that would otherwise tend to cause inaccuracy in the provided position data and speed data, wherein the one or more selected frequency components of the notch filter comprise an attenuating notch tuned to one or more of the following frequencies: a second harmonic of the fundamental frequency and the fundamental frequency multiplied by 2.5.

2. The system according to claim 1 wherein the position sensor comprises a resolver that outputs the substantially saw-tooth waveform at the sensor frequency that comprises a resolver lobe frequency.

3. The system according to claim 2 wherein the selected frequency components are adjusted to vary with changes to the fundamental frequency during operation of the motor.

4. The system according to claim 1 wherein the notch filter has a response in accordance with the following z-domain transfer function:

$$H(z) = \frac{K(z - e^{z_1 T_s})(z - e^{z_2 T_s})}{(z - e^{p_1 T_s})(z - e^{p_2 T_s})}$$

where:

$$K = \frac{1 - (p'_1 + p'_2) + p'_1 p'_2}{1 - (z'_1 + z'_2) + z'_1 z'_2}$$

z represents the z domain that is related to the s-domain by $z = e^{sT_s}$,
Ts is the sampling time in seconds in the z-domain,
z1 a first zero of the notch filter in the s-domain,
z2 is a second zero of the notch filter in the s-domain,
p1 is a first pole of the notch filter in the s-domain,
p2 is a second pole of the notch filter in the s-domain,
z1' a first zero of the notch filter in the z-domain,
z2' is a second zero of the notch filter in the z-domain,
p1' is a first pole of the notch filter in the z-domain, and
p2' is a second pole of the notch filter in the z-domain.

5. The system according to claim 1 wherein the notch filter has a response derived from a matched pole-zero method to convert accurately an s-domain transfer function into a corresponding z-domain transfer function without distortion or warping of a discrete frequency versus continuous frequency for the notch filter.

6. The system according to claim 1 further comprising a pre-processing unwrap module for processing the substantially saw-tooth waveform prior to notch filter and a post-processing wrap module for processing the substantially saw-tooth waveform after the notch filter.

7. The system according to claim 6 wherein the pre-processing unwrap module decomposes the substantially saw-tooth signal into a sum of harmonically related sinusoidal functions and wherein the post-processing wrap module reassembles the filtered harmonically related sinusoidal functions, less the removed frequency components, to a refined substantially saw-tooth signal.

8. The system according to claim 7 wherein the pre-processing unwrap module decomposes the substantially saw-tooth signal into a sum of harmonically related sinusoidal functions in accordance with the following equation:

$$x_T(t) = \sum_{n=1}^{\infty} b_n \sin(n\omega_0 t)$$

where: $x_T(t)$ is the substantially saw-tooth signal, as a function of time, t, where the saw-tooth signal can be represented in any suitable mathematical format, with a period of T; n is any of the nth sinusoidal function(s) that is(are) used to model or decompose the substantially saw-tooth signal, where n may range from any positive integer value from 1 to N total sinusoidal functions or where N may approach an infinite number as indicated in the equation; $b_n$ is an amplitude of the nth sinusoidal function; and $$\omega_0 = \frac{2\pi}{T}.$$

9. The system according to claim 1 wherein the notch filter comprises a series of filters to reject or attenuate a set of undesired frequency components.

10. The system according to claim 1 wherein the notch filter comprises a nonlinear second order filter with a group delay that is function of frequency and further comprising a compensator for compensating for the group delay to provide a substantially uniform delay versus frequency response.

11. A method for estimating a rotor position of an alternating current motor, the method comprising:
rotating a rotor of an alternating current motor in response to one or more alternating current input signals;
generating a substantially saw-tooth waveform, indicative of a position of the rotor, at a sensor frequency that is an integer multiple of the electrical fundamental frequency of the alternating current input signals;
providing position data and speed data for the rotor based on the substantially saw-tooth waveform; and
rejecting, by a notch filter, one or more selected frequency components in the substantially saw-tooth waveform to reduce distortion off the substantially saw-tooth waveform that would otherwise tend to cause inaccuracy in the provided position data and speed data, wherein the one or more selected frequency components of the notch filter comprise an attenuating notch tuned to one or more of the following frequencies: a second harmonic of the fundamental frequency and the fundamental frequency multiplied by 2.5.

12. The method according to claim 11 wherein the generating the substantially saw-tooth waveform comprises outputting the substantially saw-tooth waveform at the sensor frequency that comprises a resolver lobe frequency.

13. The method according to claim 12 wherein the one or more selected frequency components are adjusted to vary with changes to the fundamental frequency during operation of the motor.

14. The method according to claim 11 wherein the notch filter has an attenuation versus frequency response in accordance with the following z-domain transfer function:

$$H(z) = \frac{K(z - e^{z1 T_s})(z - e^{z2 T_s})}{(z - e^{p1 T_s})(z - e^{p2 T_s})}$$

where:

$$K = \frac{1 - (p'_1 + p'_2) + p'_1 p'_2}{1 - (z'_1 + z'_2) + z'_1 z'_2}$$

z represents the z domain that is related to the s-domain by $z = e^{sT_s}$,
Ts is the sampling time in seconds in the z-domain,
z1 a first zero of the notch filter in the s-domain,
z2 is a second zero of the notch filter in the s-domain,
p1 is a first pole of the notch filter in the s-domain,
p2 is a second pole of the notch filter in the s-domain,
z1' a first zero of the notch filter in the z-domain,
z2' is a second zero of the notch filter in the z-domain,
p1' is a first pole of the notch filter in the z-domain, and
p2' is a second pole of the notch filter in the z-domain.

15. The method according to claim 11 wherein the notch filter has an attenuation versus frequency response derived from a matched pole-zero method to convert accurately an s-domain transfer function into a corresponding z-domain transfer function without distortion or warping of a discrete frequency versus continuous frequency for the notch filter.

16. The method according to claim 11 further comprising:
processing the substantially saw-tooth waveform prior to the rejecting by the notch filter to decompose the substantially saw-tooth signal into a sum of harmonically related sinusoidal functions; and
processing the substantially saw-tooth waveform after the rejecting by the notch filter to reassemble the filtered harmonically related sinusoidal functions, less the removed or rejected frequency components, to a refined substantially saw-tooth signal.

17. The method according to claim 16 wherein the processing the substantially saw-tooth waveform prior to the rejecting is adapted to decompose the substantially saw-tooth signal into a sum of harmonically related sinusoidal functions in accordance with the following equation:

$$x_T(t) = \sum_{n=1}^{\infty} b_n \sin(n\omega_0 t)$$

where: $x_T(t)$ is the substantially saw-tooth signal, as a function of time, t, where the saw-tooth signal can be represented in any suitable mathematical format, with a period of T; n is any of the nth sinusoidal function(s) that is(are) used to model or decompose the substantially saw-tooth signal, where n may range from any positive integer value from 1 to N total sinusoidal functions or where N may approach an infinite number as indicated in the equation; $b_n$ is an amplitude of the nth sinusoidal function; and $$\omega_0 = \frac{2\pi}{T}.$$

18. The method according to claim 11 wherein the rejecting comprises rejecting, by a series of notch filters as the notch filter, to reject or attenuate a set of undesired frequency components.

19. The method according to claim 11 wherein the rejecting comprises compensating for a group delay in an output of the notch filter to provide a substantially uniform delay versus frequency response.

* * * * *